United States Patent [19]

Saito et al.

[11] Patent Number: 4,879,332

[45] Date of Patent: Nov. 7, 1989

[54] HALOGEN-FREE FLAME RESISTING SYNTHETIC RESIN COMPOSITION

[75] Inventors: Nobuo Saito; Mitsuo Noda, both of Chiba, Japan

[73] Assignee: Dainichiseika Color & Chemicals Mfg. Co. Ltd., Tokyo, Japan

[21] Appl. No.: 183,760

[22] PCT Filed: Aug. 7, 1987

[86] PCT No.: PCT/JP87/00593

§ 371 Date: Apr. 5, 1988

§ 102(e) Date: Apr. 5, 1988

[87] PCT Pub. No.: WO88/00959

PCT Pub. Date: Feb. 11, 1988

[30] Foreign Application Priority Data

Aug. 9, 1986 [JP] Japan .................. 61-187472

[51] Int. Cl.$^4$ .............. C08K 3/22; C08L 101/00; C09K 21/02

[52] U.S. Cl. ................. 524/436; 524/437; 524/456; 524/494; 524/556; 524/563; 524/577; 524/584; 524/586; 524/606

[58] Field of Search ........... 524/436, 437, 586, 456, 524/494, 556, 563, 577, 584, 606

[56] References Cited

FOREIGN PATENT DOCUMENTS

| | | |
|---|---|---|
| 48-18570 | 6/1973 | Japan . |
| 49-05171 | 1/1974 | Japan . |
| 49-97853 | 9/1974 | Japan . |
| 51-37178 | 10/1976 | Japan . |
| 57-10898 | 1/1982 | Japan . |
| 57-28421 | 6/1982 | Japan . |
| 59-25818 | 6/1984 | Japan . |

OTHER PUBLICATIONS

Derwent Abs. 77-78144Y/44, (J50128731), 10-75.
Derwent Abs. 86-302714/46, (J61225233), 10-66, Plvs. Tech.
Derwent Abs. 88-225617/32, (J63162230), 7-88.
Derwent Abs. 83-13856K/06, Furukawa, (J5721247), 12-82.
Derwent Abs. 88-052867/08, (J63008442), 1-88.
Derwent Abs. 81-70974D/39, Showa Elect., J56102006, 8-81.
Derwent Abs. 87-030596/05, (DE3625254), 1-87.
JAP1087-141068, Kasuya et al., (J62141068), 6-87.
JAP1086-264034, Murakami et al., J61264034, (11-86).
JAP1083-117237, Yamamoto, J58117237, (7-83).
JAP1083-001741, Yamamoto et al., J58001741, (1-83).
JAP1082-212247, Yamamoto et al., J57212247, (12-82).

*Primary Examiner*—Herbert J. Lilling
*Attorney, Agent, or Firm*—Sandler & Greenblum

[57] ABSTRACT

The present invention relates to a self-fire distinguishable halogen-free flame resisting synthetic resin composition obtained by adding 0.5 to 15 parts by weight of synthetic silicate (also called "hydrated silicic acid" or "wet silica") to 100 parts by weight of a mixture comprising 70 to 30 parts by weight of at least one thermoplastic synthetic resin and 30 to 70 parts by weight of magnesium hydroxide or aluminum hydroxide having an average particle size of 0.1 to 10 $\mu$m.

This composition is white semitranslucent unlike the one containing carbon black according to the prior art, so that it is suitable for decorative use including floor materials and wall covering materials.

12 Claims, No Drawings

HALOGEN-FREE FLAME RESISTING SYNTHETIC RESIN COMPOSITION

TECHNICAL FIELD

The present invention is appliable to the field of preparing a synthetic resin composition of a flame resisting material.

BACKGROUND ART

Recently, a wide variety of flame resisting synthetic resin compositions have been developed with the purpose of ensuring the safety against a fire. Among them, flame resisting synthetic resin compositions not containing halogen, phosphorus or antimony trioxide, i.e., so-called non-toxic flame resisting synthetic resin compositions of a halogen-free type are given special attention.

Generally, such a flame resisting synthetic resin composition of a halogen-free type contains an inorganic filler such as aluminum hydroxide or magnesium hydroxide. Further, the amount of the inorganic filler required to obtain sufficiently high flame resisting effect is generally 30 to 70% by weight based on the composition. However, a synthetic resin composition containing an inorganic filler in such a high content does not generally exhibit well-balanced strength, so that it is brittle and poor in processability.

Further, some synthetic resin compositions containing such a flame resistant filler alone do not exhibit sufficient flame resistance. Thus the simultaneous addition of such a filler and carbon black has been attempted with the purpose of overcoming these problems (see Japanese Patent Publication No. 10898/1982). The simultaneous addition thereof is known to impart high flame resistance to a synthetic resin, even when the amount of a flame resistant filler is relatively small. However, the halogen-free flame resisting compositions thus prepared are all black, so that they can not be applied to the fields wherein color discrimination is necessitated or the fields wherein importance is attached to appearance, i.e., the fields wherein the use of a black material is unfavorable (for example, wall covering material).

DISCLOSURE OF INVENTION

An object of the present invention is to provide, without using carbon black, a halogen-free flame resisting synthetic resin composition. Thus making it widely appliable to the field wherein a color-discriminable flame reisting composition must be used. In addition to fields wherein importance is attached to appearance, for example, wall covering material.

More particularly, the present invention relates to a self-fire extinguishable, halogen-free and flame resisting synthetic resin composition. This is obtained by adding 0.5 to 15 parts by weight of a synthetic silicate (also called "hydrated silicic acid" or "wet silica") to a mixture comprising 70 to 30 parts by weight of a thermoplastic synthetic resin and 30 to 70 parts by weight of magnesium hydroxide or aluminum hydroxide having an average particle size of 0.1 to 10 $\mu$m.

BEST MODE FOR CARRYING OUT THE INVENTION

Synthetic Resin

The synthetic resin to be used in the present invention may be any one as far as it is thermoplastic, and examples thereof include crystalline polyolefins such as polyethylene, ethylene-vinyl acetate copolymer (abbreviated to "EVA"), ethylene-ethyl acrylate copolymer (abbreviated to "EEA"), ethylene-methyl methacrylate copolymer (abbreviated to "EMMA") and polypropylene (abbreviated to "PP"), polystyrene, polyacrylonitrile, acrylonitrile-butadiene-styrene copolymer (abbreviated to "ABS"), nylon-6 and nylon-6,6. It is preferred from the viewpoint of the strength of the resulting composition that the resin have a melt index of 0.2 to 10.0.

Inorganic flame retardant

The inorganic flame retardant to be used in the present invention is aluminum hydroxide or magnesium hydroxide having a particle size of 0.1 to 10 $\mu$m.

According to the present invention, such a flame resistant filler may be added in an amount of 30 to 70% by weight based on the composition to thereby impart flame resistant effect to the resin.

Synthetic Silicate

The synthetic silicate to be used in the present invention is generally called "hydrated silicic acid" or "wet silica". Further, it does not have a specified crystalline structure but a network structure of Si-O, so that it is also called "amorphous silica". The synthetic silicate may be any one containing 40 to 70% by weight of $SiO_2$ as a major component and 10 to 45% by weight of MgO and CaO as secondary components. Particularly, a synthetic silicate containing 50 to 60% by weight of $SiO_2$ and 12 to 30% by weight of MgO and CaO and having an ignition loss of 10 to 30% by weight is preferred.

Other Additives

Although the composition according to the present invention essentially comprises of a thermoplastic synthetic resin, an inorganic flame retardant as described above and synthetic silicate, it may contain an antioxidant or lubricant for the purpose of enhancing the stability of the composition at processing, or a titanate or silane coupling agent for the purpose of enhancing the adhesion of the filler to the matrix in an arbitrary amount in addition to the above essential components without affecting the effect of the present invention.

Further, the composition of the present invention may also contain an organic or inorganic pigment such as carbon black, azotype pigment, cyanine blue, cyanine green, iron oxide red or titanium oxide for the purpose of coloring.

Function of the Invention

The synthetic silicate, i.e., non-crystalline silica to be used in the present invention has an amorphous steric chain of Si-O-Si-O in its structure. Therefore, it is estimated that when a synthetic silicate having such a structure is added to a halogen-free flame resisting synthetic resin composition containing an inorganic flame retardant as described above, a special flame resistant effect due to the flame resistant properties of the silicate itself and the steric flame resistant network formed in the composition be imparted to the composition. Thus substantially utilizing the generation of water by the decomposition of the inorganic flame retardant and the endothermic effect thereby.

Preparation of the composition of the present invention

The halogen-free flame resisting synthetic resin composition, according to the present invention may be prepared by using a master batch comprising a thermoplastic synthetic resin, an inorganic retardant as described above, synthetic silicate and other additives or by mixing these components each in such an amount as to give its end-use concentration and kneading the obtained mixture by an ordinary means such as single-screw type extruder, twin-screw type extruder, roll mill or Banbury mixer.

Further, synthetic silicate may be preliminarily added as such to the other components to obtain the composition of the present invention. Alternatively, a master batch comprising synthetic silicate and a synthetic resin may be added to a composition comprising a synthetic resin and an inorganic flame retardant as described above to thereby obtain the composition of the present invention.

Evaluation of the Invention

The evaluation of the composition according to the present invention is carried out as follows: Namely, when a thermoplastic resin other than polystyrene or ABS was used, the resin, an inorganic flame retardant and other additives were mixed and the obtained mixture was kneaded in a 75 l. Banbury mixer and processed with a mixing roll to obtain a sheet having a thickness of 3 mm. This sheet was reprocessed with a rectangular pelletizer to obtain a rectangular pellet having a length of each side of about 3 mm.

This rectangular pellet was repelletized with a 70φ extruder of a vent type at 150° C. to obtain a cylindrical pellet. This cylindrical pellet was used as a sample.

The cylindrical pellet was examined for oxygen index according to JIS K-7201. Further, the pellet was molded into a sheet having a thickness of 200 μm with a T-die sheet molding machine to determine the combustion rate of the sheet with a flammability tester of FMVSS-302.

When polystyrene or ABS was used as the thermoplastic synthetic resin, the resulting composition was molded with an injection machine of 3.5 ounce into a test bar according to the vertical flame test of UL-94 and the test bar was further molded into a test piece having a thickness of ⅛ inch. This test piece was used as a sample for the vertical flame test.

EXAMPLES AND COMPARATIVE EXAMPLES

The present invention will be described in more detail by referring to the following Examples and Comparative Examples.

The components constituting the composition of each Example or Comparative Example will be described, with the proviso that the amounts thereof used are shown in parts by weight and the comparative results of the compositions are shown in Tables 1 to 3.

EXAMPLE 1

| | |
|---|---|
| low-density polyethylene (YUKARON HE-30 mfd. by Mitsubishi Petrochemical Co., Ltd., MI: 0.3) | 60.0 parts |
| magnesium hydroxide (KISUMA 5B mfd. by Kyowa Chemicals Co., Ltd., average particle size: 0.8 μm) | 40.0 parts |
| synthetic silicate (SILMOS-T mfd. by Shiraishi Industrial Co., Ltd., SiO$_2$ content: 60%) | 3.0 parts |
| total | 103.0 parts |

EXAMPLE 2

| | |
|---|---|
| low-density polyethylene (the same as that used in Example 1) | 55.0 parts |
| magnesium hydroxide (the same as that used in Example 1) | 45.0 parts |
| synthetic silicate (the same as that used in Example 1) | 3.0 parts |
| total | 103.0 parts |

EXAMPLE 3

| | |
|---|---|
| low-density polyethylene (the same as that used in Example 1) | 50.0 parts |
| magnesium hydroxide (the same as that used in Example 1) | 50.0 parts |
| synthetic silicate (the same as that used in Example 1 | 1.5 parts |
| total | 101.5 parts |

EXAMPLE 4

| | |
|---|---|
| low-density polyethylene (the same as that used in Example 1) | 50.0 parts |
| magnesium hydroxide (the same as that used in Example 1) | 50.0 parts |
| synthetic silicate (the same as that used in Example 1 | 3.0 parts |
| total | 103.0 parts |

EXAMPLE 5

| | |
|---|---|
| straight-chain low-density polyethylene (ULTZEX 3520F mfd. by Mitsui Petrochemical Industries, Ltd. MI: 2.1) | 50.0 parts |
| magnesium hydroxide (KX-4S mfd. by Asahi Glass Co., Ltd., average particle size: 0.6 μm) | 50.0 parts |
| synthetic silicate (SILMOS-T mfd. by Shiraishi Industrial Co., Ltd., SiO$_2$ content: 60% | 3.0 parts |
| total | 103.0 parts |

EXAMPLE 6

| | |
|---|---|
| high-density polyethylene (HIZEX 3300F mfd. by Mitsui Petrochemical Industries, Ltd., MI: 0.9) | 50.0 parts |
| magnesium hydroxide (KISUMA 5B, the same as that used in Example 1) | 50.0 parts |
| synthetic silicate (SOLEX CM mfd. by Tokuyama Soda Co., Ltd., SiO$_2$ content: 57%) | 3.0 parts |
| total | 103.0 parts |

EXAMPLE 7

| | |
|---|---|
| ethylene-vinyl acetate copolymer (Evatate H 1011 mfd. by Sumitomo Chemical Co., Ltd., vinyl acetate content: 15%) | 50.0 parts |
| magnesium hydroxide (KISUMA 5B, the same as that used in Example 1) | 50.0 parts |
| synthetic silicate (SOLEX CM, the same as that used in Example 6) | 3.0 parts |

| -continued | |
|---|---|
| total | 103.0 parts |

EXAMPLE 8

| | |
|---|---|
| polypropylene (JHG mfd. by Mitsui Toatsu Chemicals, Inc., MI: 4.0) | 50.0 parts |
| magnesium hydroxide (KISUMA 5B, the same as that used in Example 1) | 50.0 parts |
| synthetic silicate (SOLEX CM, the same as that used in Example 6) | 3.0 parts |
| total | 103.0 parts |

EXAMPLE 9

| | |
|---|---|
| low-density polyethylene (YUKARON HZ-30, the same as that used in Example 1) | 50.0 parts |
| aluminum hydroxide (HIGILITE H-42M mfd. by Showa Light Metal Co., Ltd., average particle size: 0.8 μm) | 50.0 parts |
| synthetic calcium silicate (SOLEX CM, the same as that used in Example 6) | 3.0 parts |
| total | 103.0 parts |

EXAMPLE 10

| | |
|---|---|
| low-density polyethylene (YUKARON HZ-30, the same as that used in Example 1) | 50.0 parts |
| magnesium hydroxide (KISUMA 5B, the same as that used in Example 1) | 50.0 parts |
| synthetic calcium silicate (SILMOS-T, the same as that used in Example 1) | 7.0 parts |
| total | 107.0 parts |

EXAMPLE 11

| | |
|---|---|
| low-density polyethylen (YUKARON HZ-30, the same as that used in Example 1) | 50.0 parts |
| aluminium hydroxide (HIGILITE H-42M mfd. by Showa Light Metal Co., Ltd., average particle size of 0.8 μm) | 50.0 parts |
| synthetic calcium silicate (SILMOS-T, the same as that used in Example 1) | 10.0 parts |
| total | 110.0 parts |

EXAMPLE 12

| | |
|---|---|
| polystyrene (STYRON 470 mfd. by Asahi Chemical Industry Co., Ltd., MI:4.0) | 50.0 parts |
| magnesium hydroxide (KISUMA 5B, the same as that used in Example 1) | 50.0 parts |
| synthetic calcium silicate (SILMOS-T, the same as that used in Example 1) | 3.0 parts |
| total | 103.0 parts |

EXAMPLE 13

| | |
|---|---|
| ABS (DENKA OF mfd. by Denki Kagaku Kogyo K.K.) | 50.0 parts |
| magnesium hydroxide (KISUMA 5B, the same as that used in Example 1) | 50.0 parts |
| synthetic calcium silicate (SILMOS-T, the same as that used in Example 1) | 3.0 parts |

| -continued | |
|---|---|
| total | 103.0 parts |

COMPARATIVE EXAMPLE 1

| | |
|---|---|
| low-density polyethylene (YUKARON HZ-30 mfd. by Mitsubishi Petrochemical Co., Ltd., MI:0.3) | 60.0 parts |
| magnesium hydroxide (KISUMA 5B, mfd. by Kyowa Chemicals Co., Ltd., average particle size: 0.8 μm) | 40.0 parts |
| total | 100.0 parts |

COMPARATIVE EXAMPLE 2

| | |
|---|---|
| low-density polyethylene (the same as that used in Comparative Example 1) | 55.0 parts |
| magnesium hydroxide (the same as that used in Comparative Example 1) | 45.0 parts |
| total | 100.0 parts |

COMPARATIVE EXAMPLE 3

| | |
|---|---|
| low-density polyethylene (the same as that used in Comparative Example 1) | 50.0 parts |
| magnesium hydroxide (the same as that used in Comparative Example 1) | 50.0 parts |
| total | 100.0 parts |

COMPARATIVE EXAMPLE 4

| | |
|---|---|
| straight-chain low-density polyethylene (ULTZEX 2020L mfd. by Mitsui Petrochemical Industries, Ltd., MI:2.1) | 50.0 parts |
| magnesium hydroxide (the same as that used in Comparative Example 1) | 50.0 parts |
| total | 100.0 parts |

COMPARATIVE EXAMPLE 5

| | |
|---|---|
| high-density polyethylene (HIZEX 3300F mfd. by Mitsui Petrochemical Industries, Ltd., MI:0.9) | 50.0 parts |
| magnesium hydroxide (the same as that used in Comparative Example 1) | 50.0 parts |
| total | 100.0 parts |

COMPARATIVE EXAMPLE 6

| | |
|---|---|
| low-density polyethylene (the same as that used in Comparative Example 1) | 50.0 parts |
| magnesium hydroxide (the same as that used in Comparative Example 1) | 50.0 parts |
| crystalline silica (TOKUSIL U mfd. by Tokuyama Soda Co., Ltd., SiO$_2$ content: 95%) | 3.0 parts |
| total | 103.0 parts |

COMPARATIVE EXAMPLE 7

| | |
|---|---|
| low-density polyethylene (the same as that used in Comparative Example 1) | 50.0 parts |
| magnesium hydroxide (the same as that used in Comparative Example 1) | 50.0 parts |
| mica (Mica #300 mfd. by Repco, average particle size: 2 μm) | 3.0 parts |

-continued

| total | 103.0 parts |
|---|---|

COMPARATIVE EXAMPLE 8

| low-density polyethylene (the same as that used in Comparative Example 1) | 50.0 parts |
|---|---|
| magnesium hydroxide (the same as that used in Comparative Example 1) | 50.0 parts |
| calcium magnesium carbonate (Pigment white 18A mfd. by Shiraishi Industrial Co., Ltd., average particle size: 1 μm) | 3.0 parts |
| total | 103.0 parts |

COMPARATIVE EXAMPLE 9

| low-density polyethylene (the same as that used in Comparative Example 1) | 50.0 parts |
|---|---|
| magnesium hydroxide (the same as that used in Comparative Example 1) | 50.0 parts |
| carbon black (Mitsubishi MB #30 mfd. by Mitsubishi Chemical Industries, Ltd.) | 3.0 parts |
| total | 103.0 parts |

COMPARATIVE EXAMPLE 10

| polystyrene (STYRON 470 mfd. by Asahi chemical Industry Co., Ltd., MI: 4.0) | 50.0 parts |
|---|---|
| magnesium hydroxide (the same as that used in Comparative Example 1) | 50.0 parts |
| total | 100.0 parts |

COMPARATIVE EXAMPLE 11

| ABS (DENKA OF mfd. by Denki Kagaku Kogyo K.K.) | 50.0 parts |
|---|---|
| magnesium hydroxide (the same as that used in Comparative Example 1) | 50.0 parts |
| total | 100.0 parts |

TABLE 1
Results of Examples using crystalline olefin

| No. | Synthetic resin | Flame resistant filler | Additive | Oxygen index | combustion rate (mm/min) |
|---|---|---|---|---|---|
| Ex. 1 | 60.0 LDPE | 40.0 Mg(OH)$_2$ | 3.0 SILMOS-T | 24.0 | 68.0 |
| Ex. 2 | 55.0 LDPE | 45.0 Mg(OH)$_2$ | 3.0 SILMOS-T | 27.0 | 46.0 |
| Ex. 3 | 50.0 LDPE | 50.0 Mg(OH)$_2$ | 1.5 SILMOS-T | 29.2 | o |
| Ex. 4 | 50.0 LDPE | 50.0 Mg(OH)$_2$ | 3.0 SILMOS-T | 30.4 | o |
| Ex. 5 | 50.0 LDPE | 50.0 Mg(OH)$_2$ | 3.0 SILMOS-T | 30.2 | o |
| Ex. 6 | 50.0 HDPE | 50.0 Mg(OH)$_2$ | 3.0 SOLEX CM | 29.6 | o |
| Ex. 7 | 50.0 EVA | 50.0 Mg(OH)$_2$ | 3.0 SOLEX CM | 30.4 | o |
| Ex. 8 | 50 0 PP | 50.0 Mg(OH)$_2$ | 3.0 SOLEX CM | 29.8 | o |
| Ex. 9 | 50.0 LDPE | 50.0 Al(OH)$_3$ | 3.0 SOLEX CM | 29.4 | o |
| Ex. 10 | 50.0 LDPE | 50.0 Mg(OH)$_2$ | 7.0 SILMOS-T | 30.0 | o |
| Ex. 11 | 50.0 LDPE | 50.0 Al(OH)$_3$ | 10.0 SILMOS-T | 29.8 | o |

TABLE 2
Results of Comparative Examples using crystalline olefin

| No. | Synthetic resin | Flame resistant filler | Additive | Oxygen index | Combustion rate (mm/min) |
|---|---|---|---|---|---|
| Comp. Ex. 1 | 60.0 LDPE | 40.0 Mg(OH)$_2$ | — | 22.4 | 180.0 |
| Comp. Ex. 2 | 55.0 LDPE | 45.0 Mg(OH)$_2$ | — | 24.2 | 78.0 |
| Comp. Ex. 3 | 50.0 LDPE | 50.0 Mg(OH)$_2$ | — | 25.2 | 76.0 |
| Comp. Ex. 4 | 50.0 LDPE | 50.0 Mg(OH)$_2$ | — | 24.8 | 84.0 |
| Comp. Ex. 5 | 50.0 HDPE | 50.0 Mg(OH)$_2$ | — | 25.4 | 80.0 |
| Comp. Ex. 6 | 50.0 LDPE | 50.0 Mg(OH)$_2$ | 3.0 crystalline silica | 25.6 | 67.0 |
| Comp. Ex. 7 | 50.0 LDPE | 50.0 Mg(OH)$_2$ | 3.0 mica | 25.2 | 73.0 |
| Comp. Ex. 8 | 50.0 LDPE | 50.0 Mg(OH)$_2$ | 3.0 carbonate | 25.0 | 81.0 |
| Comp. Ex. 9 | 50.0 LDPE | 50.0 Mg(OH)$_2$ | 3.0 carbon black | 29.4 | o |

(note) LDPE refers to low-density polyethylene, HDPE refers to high-density polyethylene and EVA refers to ethylene-vinyl acetate copolymer. The symbol "o" in the column of combustion rate means that the test sheet or test piece did not burn up to the mark, i.e., that the test sheet or test piece was self-fire extinguishable.

TABLE 3
Examples and Comparative Examples using styrenic resin

| No. | Synthetic resin | Flame resistant filler | Additive | Oxygen index | UL 94 (⅛") |
|---|---|---|---|---|---|
| Ex. 12 | 50.0 PS | 50.0 Mg(OH)$_2$ | 3.0 SILMOS-T | 29.0 | V-1 |
| Ex. 13 | 50.0 ABS | 50.0 Mg(OH)$_2$ | 3.0 SILMOS-T | 29.4 | V-1 |
| Comp. Ex. 10 | 50.0 PS | 50.0 Mg(OH)$_2$ | — | 26.0 | HB |
| Comp. Ex. 11 | 50.0 ABS | 50.0 Mg(OH)$_2$ | — | 25.6 | HB |

(note)
PS refers to polystyrene.
"V-1" means that the flame of the test piece guttered out within 30 seconds after contacting the test piece with flame.
"HB" means that the test is did not burn until the mark in the horizontal flame test, though the test piece did not fit the vertical flame test.

INDUSTRIAL APPLICABILITY

According to the present invention, a white semi-translucent synthetic resin composition which is highly flame resistant and does not generate any toxic substance can be obtained, though such a composition can not be obtained according to the prior art. The flame resisting synthetic resin composition of the present invention will be able to be used in a wide field requiring color discrimination, for example, floor materials of a nuclear power station.

What is claimed is:

1. A self-extinguishing, halogen-free flame retardant composition comprising 70 to 30 parts by weight of at least one thermoplastic synthetic resin, 30–70 parts by weight of magnesium hydroxide having an average particle size of 0.1 to 10 μm, and 0.5–15 parts by weight of a synthetic silicate which is a non-crystalline silica having an amorphous steric chain of Si-O-Si-O in its structure.

2. The composition as defined by claim 1 wherein said at least one thermoplastic resin is selected from the group consisting of low-density polyethylene, high density polyethylene, ethylene-vinyl acetate copolymer, ethylene-ethyl acrylate copolymer, ethylene-methyl methacrylate copolymer, polypropylene, polystyrene, polyacrylonitrile, acrylonitrile-butadiene-styrene copolymer, nylon 6, and nylon-6,6.

3. The composition as defined by claim 1 wherein said thermoplastic synthetic resin has a melt index of 0.2 to 10.0.

4. The composition as defined by claim 1 wherein said synthetic silicate comprises 40 to 70% by weight $SiO_2$ and 10 to 45% by weight MgO and CaO.

5. The composition as defined by claim 4 wherein said synthetic silicate comprises 50 to 60% by weight $SiO_2$, 12 to 30% by weight MgO and CaO, and an ignition loss of 10 to 30% by weight.

6. The composition as defined by claim 1 wherein the sum of said thermoplastic synthetic resin and said magnesium hydroxide equals 100 parts by weight.

7. A self-extinguishing, halogen-free, flame retardant composition comprising 70 to 30 parts by weight of at least one thermoplastic synthetic resin, 30–70 parts by weight of magnesium hydroxide having an average particle size of 0.6 to 0.08 μm, and 0.5–15 parts by weight of a synthetic silicate salt.

8. The composition as defined by claim 7 wherein said at least one thermoplastic resin is selected from the group consisting of low-density polyethylene, high density polyethylene, ethylene-vinyl acetate copolymer, ethylene-ethyl acrylate copolymer, ethylene-methyl methacrylate copolymer, polypropylene, polystyrene, polyacrylonitrile, acrylonitrile-butadiene-styrene copolymer, nylon 6, and nylon-6,6.

9. The composition as defined by claim 7 wherein said thermoplastic synthetic resin has a melt index of 0.2 to 10.0.

10. The composition as defined by claim 7 wherein said synthetic silicate comprises 40 to 70% by weight $SiO_2$ and 10 to 45% by weight MgO and CaO.

11. The composition as defined by claim 10 wherein said synthetic silicate comprises 50 to 60% by weight $SiO_2$, 12 to 30% by weight MgO and CaO, and an ignition loss of 10 to 30% by weight.

12. The composition as defined by claim 7 wherein the sum of said thermoplastic synthetic resin and said magnesium hydroxide equals 100 parts by weight.

* * * * *

UNITED STATES PATENT AND TRADEMARK OFFICE
CERTIFICATE OF CORRECTION

PATENT NO. : 4,879,332

DATED : November 7, 1989

INVENTOR(S) : N. SAITO et al

It is certified that error appears in the above-identified patent and that said Letters Patent is hereby corrected as shown below:

Column 5, line 42, first line in Example 11, change "polyethylen" to --polyethylene--.

Column 7, Table I, under Synthetic resin for Ex. 8, change "50 0" to --50.0--.

Signed and Sealed this

Twenty-eighth Day of May, 1991

Attest:

HARRY F. MANBECK, JR.

Attesting Officer          Commissioner of Patents and Trademarks